(12) United States Patent
Kochanski et al.

(10) Patent No.: US 6,526,895 B1
(45) Date of Patent: *Mar. 4, 2003

(54) LAPTOP COMPUTER SUPPORT WITH POWER, DATA, AND VOICE

(75) Inventors: Walter T. Kochanski, Fort Wayne, IN (US); Edward J. Keil, Rome City, IN (US)

(73) Assignee: Group Dekko Services, LLC, Kendallville, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 09/694,552

(22) Filed: Oct. 23, 2000

Related U.S. Application Data

(63) Continuation of application No. 09/310,833, filed on May 12, 1999, now Pat. No. 6,202,568, which is a continuation-in-part of application No. 29/096,684, filed on Nov. 18, 1998, now Pat. No. Des. 425,877.

(51) Int. Cl.[7] .............................................. A47B 37/00
(52) U.S. Cl. ................... 108/50.02; 108/50.01
(58) Field of Search ........................ 108/50.02, 50.01, 108/23; 312/223.6, 223.5, 223.3

(56) References Cited

U.S. PATENT DOCUMENTS

| | | | | |
|---|---|---|---|---|
| 4,792,881 A | * | 12/1988 | Wilson et al. | 312/223.6 X |
| 4,932,332 A | * | 6/1990 | Noda | 108/50.02 |
| 5,226,705 A | * | 7/1993 | Rorke et al. | 108/50.02 X |
| 5,230,552 A | * | 7/1993 | Schipper et al. | 312/223.6 |
| 5,231,562 A | * | 7/1993 | Pierce et al. | 108/50.02 X |
| 5,339,213 A | * | 8/1994 | O'Callaghan | 312/223.6 X |
| 5,421,271 A | * | 6/1995 | Sui | 108/50.02 |
| 5,595,428 A | * | 1/1997 | Huang | 312/223.6 X |
| 5,738,422 A | * | 4/1998 | Welborn, Jr. et al. | 312/223.6 X |
| 5,769,514 A | * | 6/1998 | Brown et al. | 108/50.01 X |
| 5,901,513 A | * | 5/1999 | Mollenkopf et al. | 108/50.02 X |
| 5,931,103 A | * | 8/1999 | Huang | 108/50.02 |
| 5,994,644 A | * | 11/1999 | Rindoks et al. | 108/50.02 X |
| 6,076,473 A | * | 6/2000 | Conte | 108/50.01 |
| 6,202,568 B1 | * | 3/2001 | Kochanski et al. | 108/50.02 |

FOREIGN PATENT DOCUMENTS

FR        73977      10/1960      312/223.6

* cited by examiner

Primary Examiner—Jose V. Chen
(74) Attorney, Agent, or Firm—Taylor & Aust, P.C.

(57) ABSTRACT

A support for use with a laptop computer includes a support member having a top surface for supporting the laptop computer. The top surface includes an electrical receptacle, a data connector and a telephone connector.

16 Claims, 2 Drawing Sheets

LAPTOP COMPUTER SUPPORT WITH POWER, DATA, AND VOICE

CROSS REFERENCE TO RELATED APPLICATION

This is a continuation of application Ser. No. 09/310,833 filed May 12, 1999, now U.S. Pat. No. 6,202,568 which is a continuation-in-part of application Ser. No. 29/096,684 filed Nov. 18, 1998 now U.S. Pat. No. D425,877.

BACKGROUND OF THE INVENTION

1. Field of the Invention

The present invention relates to a support and, more particularly, to a support for a laptop computer.

2. Description of the Related Art

Advancements in technology and miniaturization have made the manufacture of reliable portable, or lap top, computers possible. Laptop computers have come into widespread use for both business and personal computing needs. Companies are increasingly deciding to purchase laptop computers for their employees, particularly those employees that may be required to travel, or work from locations other than their primary office.

Laptop computers, typically powered by a battery, are often connected, through a transformer assembly or power adapter, to a conventional electrical receptacle providing 120 Volt alternating current. This avoids unnecessarily draining the battery of the laptop computer, and permits charging of the battery, when the user is, for example, in the office or at home and an electrical outlet is conveniently available. Other devices, such as full-sized keyboards, monitors, and various other peripheral devices are sometimes attached to a laptop computer when the user is, for example, in the off ice or at home. The laptop is often connected to those peripheral devices, including a source of electrical power, through the use of a docking station.

The docking station is typically placed on a surface, such as a desk, and receives the laptop computer. The docking station includes connectors that correspond to and mate with the corresponding connectors of the peripheral devices, thereby establishing a connection between the peripheral devices and the docking station. The docking station also has connectors which correspond to and mate with connectors on the portable computer, thereby establishing a connection between the portable computer and the docking station, and thus operatively coupling the computer and the peripheral devices. In addition to connecting the laptop computer with peripheral devices such as monitors, keyboards and printers, many docking stations also facilitate connection of the computer with a telephone and/or data line, thereby enabling the computer user to connect to a local area network or to the Internet.

By design, many docking stations facilitate the precise alignment and mating of the dense and finely-pitched connectors typically used and required in connecting a laptop computer to a peripheral device. Obviously, the structure to facilitate the precise alignment of the dense and finely-pitched connectors, and the connectors themselves, form a major portion of the cost of a docking station. With continued advancement in technology and miniaturization, the need to attach a laptop computer to peripheral devices such as monitors and keyboards is rapidly diminishing. The quality of the screens and keyboards provided as original equipment with many laptop computers has dramatically increased within the last few years. Many companies and individuals that purchase laptop computers will not or cannot bear the additional cost of purchasing peripheral devices for attachment thereto. For the above reasons, many laptop computer users are not connecting to such peripheral devices. Yet, despite similar advances in battery technology and operating life, there remains a need to connect most laptop computers to a source of power in order to prevent unnecessarily draining, and to enable charging, of the battery of the laptop computer. Furthermore, there remains a need to connect laptop computers with a telephone and/or data line to enable access to a local area network or the Internet.

The laptop, when used in the home or office, is typically attached to a docking station that is placed on a working surface of a desk. Thus, in addition to any peripheral devices to which the laptop is attached via the docking station, the docking station and laptop are further occupying limited desk space.

What is needed in the art is a laptop support that facilitates connection of the laptop to a power source and to a telephone and/or data line and which does not occupy limited desk top space.

SUMMARY OF THE INVENTION

The present invention provides a laptop support that includes connections to a power source, telephone line, and data line.

The invention comprises, in one form thereof, a laptop support having two electrical receptacles to receive a three-pronged electrical appliance plug, a connection for a telephone line jack, and a connection for a data line.

An advantage of the present invention is that the laptop support provides for connection of the laptop computer to a power source, a telephone line, and a data line.

Another advantage is that the laptop support can be retractably mounted to the underside of a desk, thereby conserving limited desk space for productive use.

Yet another advantage is the cost of providing undesired additional connections for other peripheral devices to the laptop is avoided.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
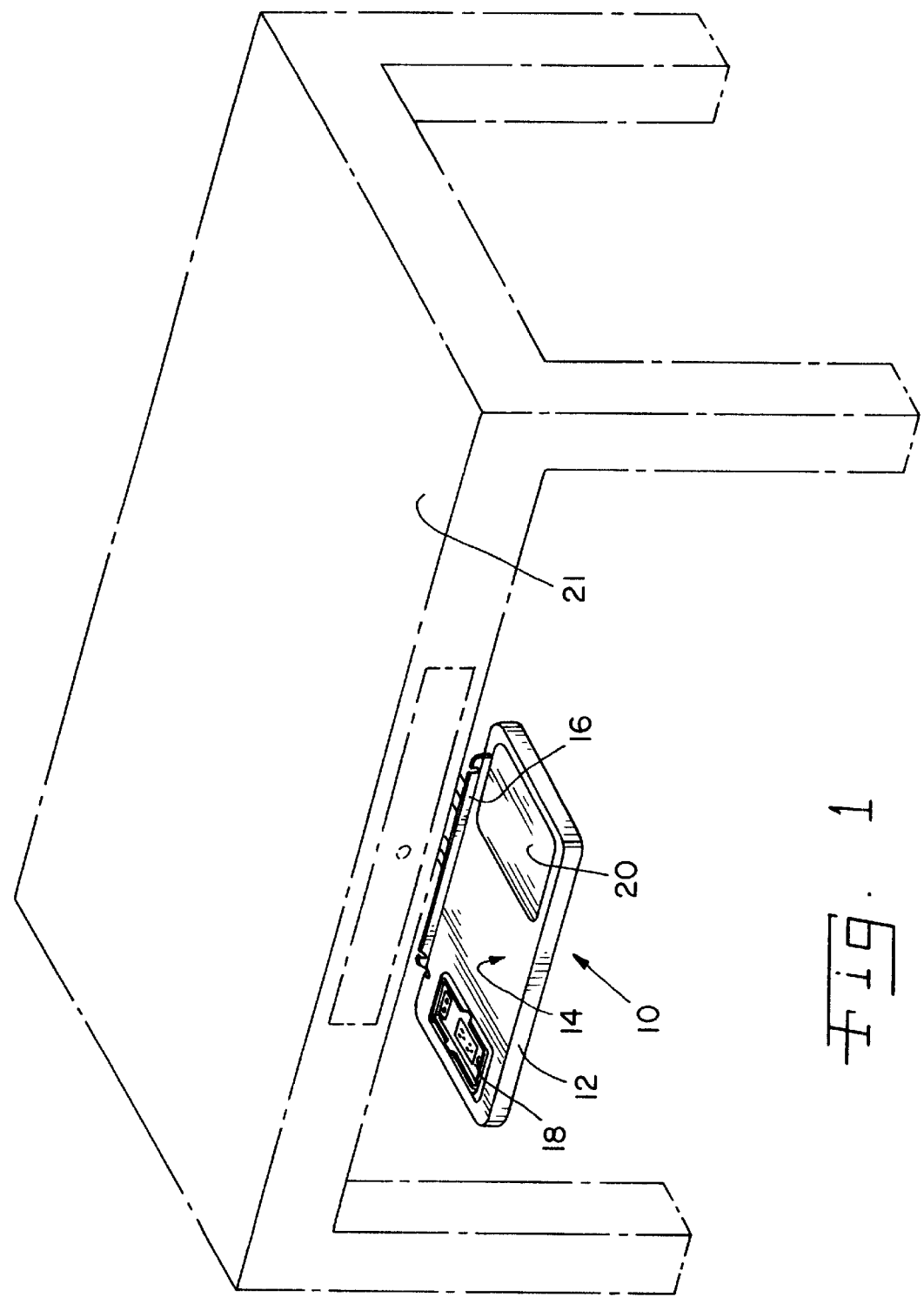
FIG. 1 is a perspective view of one embodiment of a laptop support of the present invention.
Figure 2:
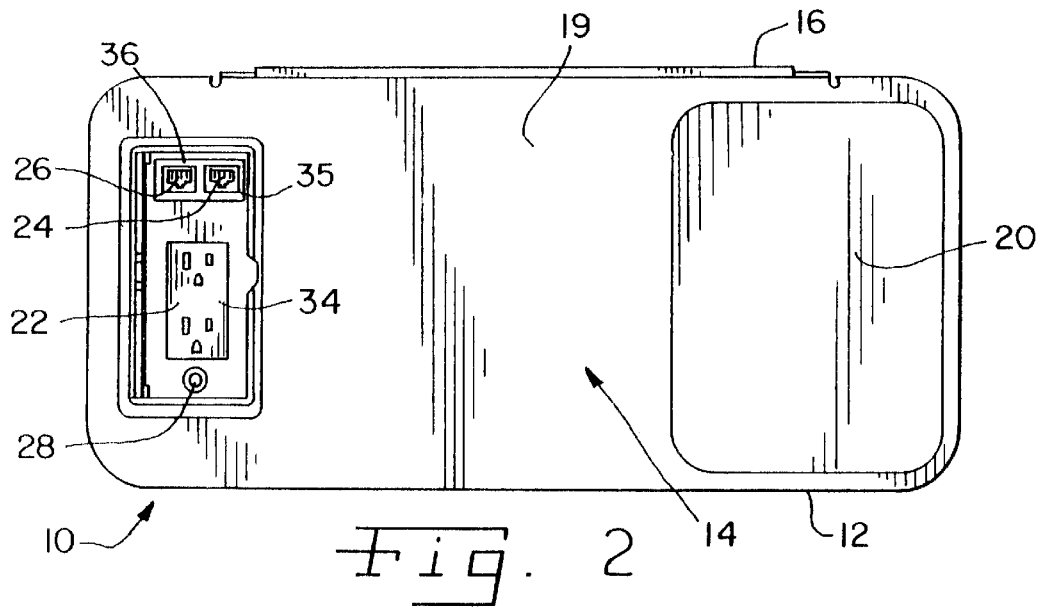
FIG. 2 is a top view of the laptop support of FIG. 1.
Figure 3:
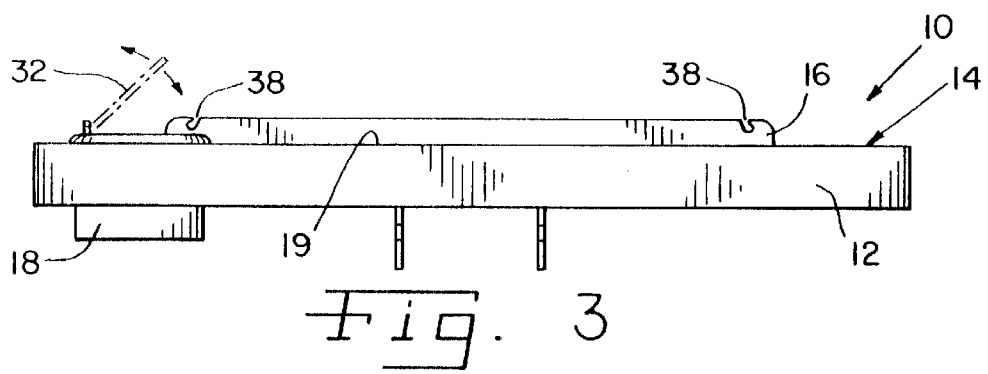
FIG. 3 is a front view of the laptop support of FIG. 1.
Figure 4:
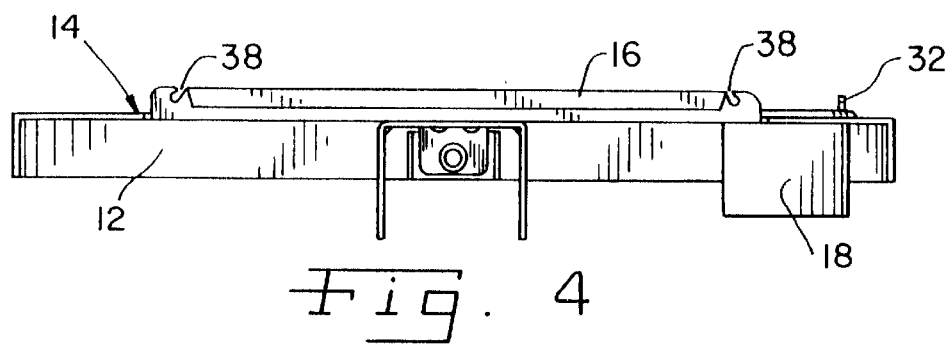
FIG. 4 is a rear view of the laptop support of FIG. 1.
Figure 5:
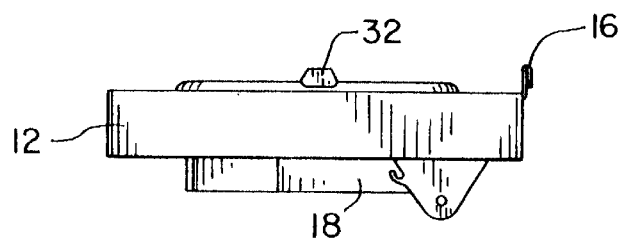
FIG. 5 is a side view of the laptop support of FIG. 1.

Referring now to the drawings, there is shown a laptop support 10 of the present invention. Laptop support 10 includes a support member 12, with a top surface 14, and a rear surface 16.

Support member 12 is constructed of a material having suitable strength and rigidity for supporting a laptop computer, such as molded plastic or fiberglass. Support member 12 is slidingly and pivotably attached to the bottom side of desk 21 in such a way as to permit support member 12 to be moved forward or backward and raised or lowered by the computer user to find a comfortable operating position. When not in use, support member 12 may be lowered and moved backward to a position underneath desk 21.

Top surface 14 is integral with support member 12 and includes a connector box 18, a support surface 19 and a recessed surface 20. Support surface 19 is the portion of top surface 14 between and surrounding connector box 18 and recessed surface 20 upon which the laptop is placed. Support surface 19 is preferably constructed of an electrically insulative material such as plastic or rubber.

Connector box 18 is attached to and carried by support member 12. Connector box 18 includes electrical receptacle 22, telephone connection 24, data connection 26, headphone jack 28 and lid 32. Connector box 18 is preferably formed of a material which is electrically insulating. Electrical receptacle 22 is a duplex receptacle, having a top connecting surface 34. Telephone connection 24 and data connection 26 are disposed adjacent relative to each other and relative to electrical receptacle 22. Telephone connection 24 has a top connecting surface 35, and data connection 26 has a top connecting surface 36. In the embodiment shown, top connecting surfaces 34, 35 and 36 of each of electrical receptacle 22, telephone connection 24 and data connection 26, respectively, are coplanar relative to each other and parallel to support surface 19 of support member 12.

Recessed area or recess 20 is disposed in top surface 14. Recess 20 accommodates a mouse pad, or simply serves as a place where pens, pencils, paperclips, and the like may be conveniently placed and retained without rolling off or sliding from support surface 14.

Lid 32 of connector box 18 is slidably and pivotably attached to connector box 18. Lid 32 pivots between a closed position and an open position. In the closed position, lid 32 is substantially parallel with top surface 14 and substantially entirely overlies connector box 18. In the open position, lid 32 is substantially perpendicular to top surface 14. From the open position, lid 32 may be slid down within connector box 18 tp a retracted position. In the retracted position, only a small portion of lid 32 extends above top surface 14. That small portion can be grasped in order to close lid 32. Closing is accomplished by sliding lid 32 back up to the open position from where it can be again pivoted into the closed position described above.

Rear vertical surface 16 extends a slight predetermined distance above top surface 14, thereby ensuring the laptop computer is not displaced from top surface 14 in a rearward direction. Rear vertical surface 16 includes notches 38, which are sized to accommodate a wire interconnecting the computer with a pointing device, or mouse (not shown).

In use, a lap top computer is placed on top surface 14 of support member 12. If it is desired to operate the lap top from an external power source or charge the battery of the laptop, the laptop can be plugged into one of the receptacles of electrical receptacle 22 by use of a suitable power cord or power adapter. If the laptop computer is equipped with a modem or speaker phone, connection to the telephone line is accomplished through connecting the laptop to telephone connection 24 by use of a suitable connecting cord. Similarly, connection to a local area network or data line can be accomplished by connecting the laptop to data connection 26 through the use of a suitable connecting cord. Headphone jack 28 is used to connect a pair of headphones or similar device to the laptop so that the computer user may listen to sound that would normally be produced by the audio speakers of the laptop or external speakers connected thereto.

The height and position of support member 12 relative to the user may be adjusted for individual preference. When electrical receptacle 22, telephone connection 24, and data connection 26 are not in use, lid 32 may be slid up from its retracted position to its open position and pivoted over to its closed position to cover those items. In the closed position, lid 32 keeps electrical receptacle 22, telephone connection 24, and data connection 26 free from the accumulation of foreign particles and substances which may cause intermittent or poor connection. If it is necessary to reconnect the laptop to, for example, electrical receptacle 22, this can be accomplished by pivoting the lid 32 upward to an open position. While in this open position, lid 32 is substantially perpendicular to top surface 14 and may be slid down into connector box 18 for storage.

In the embodiment shown, electrical receptacle 22 is a duplex receptacle. However, it is to be understood that electrical receptacle 22 can be alternatively configured as, for example, a simplex receptacle. Furthermore, top connecting surfaces 34, 35, and 36 are, in the embodiment shown, coplanar relative to each other and relative to top surface 14. However, it is to be understood that top surfaces 34, 35 and 36 can be alternatively configured to be, for example, recessed relative to top surface 14.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A support for use with a laptop computer, comprising: a support member configured to be retractably mounted to an underside of a work surface of a desk, said support member having a top surface configured for interfacing with the laptop computer, said top surface including a support surface configured for supporting the laptop computer and further including at least one electrical receptacle, at least one data connector, and at least one telephone connector.

2. The support of claim 1, wherein said at least one electrical receptacle comprises a duplex electrical receptacle.

3. The support of claim 1, wherein said at least one data connector comprises an RJ-style modular connector.

4. The support of claim 1, wherein said at least one telephone connector comprises an RJ-style modular connector.

5. The support of claim 1, wherein said at least one electrical receptacle, said at least one data connector and said at least telephone connector are disposed adjacent to each other.

6. The support of claim 5, wherein each of said at least one electrical receptacle, said at least one data connector and said at least one telephone connector has a respective top connecting surface substantially parallel to said support surface.

7. The support of claim 6, wherein said top connecting surface of said at least one electrical receptacle, said top connecting surface of said at least one data connector and said top connecting surface of said at least one telephone connector are each substantially coplanar with said support surface.

8. The support of claim 1, wherein said top surface of said support member includes a recess, said recess being configured for receiving a mouse pad therein.

9. The support of claim 1, further including at least one audio connector carried by said support member.

10. A desk assembly, comprising:

a desk having a top and an underside;

a support member having a top surface, said support member being retractably mounted to said underside of said desk and being configured for supporting a laptop computer and interfacing therewith;

at least one electrical receptacle attached to said support member, said at least one electrical receptacle being adjacent to said top surface;

at least one data connector attached to said support member, said at least one data connector being adjacent to said top surface; and at least one telephone connector attached to said support member, said at least one telephone connector being adjacent to said top surface.

11. The desk assembly of claim 10, wherein said at least one electrical receptacle comprises a duplex electrical receptacle.

12. The desk assembly of claim 10, wherein said at least one data connector comprises an RJ-style modular connector.

13. The desk assembly of claim 10, wherein said at least one telephone connector comprises an RJ-style modular connector.

14. The desk assembly of claim 10, further comprising at least one female audio jack attached to said support member, said at least one female audio connector configured for receiving a male audio connector and being adjacent to said top surface.

15. A support for supporting an electronic device and attachable with a work surface, comprising:

a support member configured to be retractably mounted to an underside of a desk, said support member having a top surface configured for supporting the electronic device, said support member being configured for interfacing with the electronic device, said support member including at least one electrical receptacle, at least one data connector, and at least one telephone connector.

16. The support of claim 1, wherein the support surface configured for supporting the laptop computer is constructed of an electrically insulative, polymeric material.

* * * * *